Patented Oct. 13, 1942

2,298,793

UNITED STATES PATENT OFFICE 2,298,793

BITUMINOUS PAINT

August Holmes, Cranford, N. J., assignor to Standard Oil Development Company, a corporation of Delaware No Drawing. Application July 1, 1939,
Serial No. 282,482

3 Claims. (Cl. 106—14)

This invention relates to improvements in protective coating compositions and to methods of protecting surfaces against corrosion, and more particularly in the use of asphalts derived from petroleum hydrocarbons in coating compositions.

A petroleum crude oil may be distilled until no more volatile petroleum fractions are obtained overhead and a hard carbon or cokey residue remains in the still. The distillation may be stopped before this hard cokey residue is formed in the bottom of the still so that either a fluid or plastic residue of asphaltic material is obtained. This asphaltic material has various uses, such as in the preparation of coating compositions and also as a bonding agent for mineral aggregate. When used in coating preparations, it is known to inhibit rust formation but only for a limited time. The formation of another asphaltic material also results when petroleum distillates obtained in the distillation of a crude are subjected to high temperatures with or without high pressures, whereby the hydrocarbons of high molecular weight are broken up to form volatile hydrocarbons of lower molecular weights having lower boiling points than those of the original distillate. This is called "cracking" of petroleum hydrocarbons. In this operation, the asphaltic tar or residue of higher boiling point obtained may be reduced by distillation and/or oxidation to any desired softening point.

An object of this invention is the production of improved bituminous materials that are particularly suitable for the manufacture of coating compositions. A still further object of the invention is in the preparation of improved coating compositions that will inhibit the formation of rust over prolonged periods of time.

According to this invention, a gas oil or an oil having a gravity of about 30° to 35° A. P. I. is subjected to a high temperature of about 800° F. to 1000° F. and a pressure of 6 to 2000 pounds per square inch. This heating step is performed in a narrow confined stream or a coil and the heated petroleum hydrocarbons are then introduced into a large drum where asphaltic tar residues precipitate out. These asphaltic tar residues hereafter will be called cracking coil tar residues after volatile fractions are separated therefrom. These tar residues have been discovered to be particularly useful for preventing rust formation on metallic substances.

The cracking coil tar residue may be reduced by distillation to any desired softening point, dissolved in a volatile petroleum hydrocarbon solvent and used as a paint to coat a metallic surface, such as the surfaces of iron or steel pipes, tanks, etc. If desired, there may also be added a drying oil, such as linseed oil, China-wood oil, etc. This coating composition, when used as a paint base for retarding the rusting of iron structures, has been found to be superior in its properties over other asphaltic base paints. This is illustrated in the following tables:

TABLE 1

Outdoor weathering tests on uninhibited paints

| Asphalt base | Days to failure | |
|---|---|---|
| | Initial | Final |
| Colombian 31/40 penetration | 59 | 102 |
| Colombian 160/180° F. softening point oxidized asphalt | 73 | 96 |
| Mexican 160/170° F. softening point steam reduced asphalt | 90 | 126 |
| Cracking coil tar 140° F. softening point | 126 | 215 |

The cracking coil tar of 140° F. softening point asphalt protected the surface of iron for a substantially longer period of time than any of the above asphalt paints. Cracking coil tars having softening points ranging from 140° to 220° F. are preferred. The effect of weathering is illustrated in the following table:

TABLE 2

Outdoor weathering—Six months—Asphalt base primers

| Process | Source | | | | | | | |
|---|---|---|---|---|---|---|---|---|
| | Colombian | | Mexican | | Venezuelan | | 750# C. C. tar | |
| | S. P. | Condition after weathering | S. P. | Condition after weathering | S. P. | Condition after weathering | S. P. | Condition after weathering |
| Straight reduced | 117 | R₂ | 118 | R₂ | 119 | R₂ | 119 | R₁ |
| | 174 | R₃ | 167 | R₃ | 171 | R₁ | 170 | R₁ |
| Oxidized from a flux oil | 122 | R₂ | 128 | R₂ | 122 | R₁ | 121 | R₁ |
| | 173 | R₃ | 164 | R₃ | 166 | R₂ | 168 | R₁ |

R¹=slight rust—generally on edges.
R²=heavier rust—evidence of start of failure.
R³=severe rust—metal rusted throughout surface.

A flux oil is a petroleum residual oil obtained by the reduction of a petroleum tar to a softening point above 75° F.

These data confirm those cited before as showing the superior qualities of cracking coil tar asphalts for protective purposes.

Another advantage is that the water absorption capacity of the cracking coil tar asphalt is materially less than that of other asphalts prepared from petroleum oils, as illustrated by the following table:

TABLE 3

*Water absorption of asphalts*

| Crude source | Grade — Ball and ring softening point | Process | Water absorption — Immersion in water for 56 days |
|---|---|---|---|
| | | | Mg. per sq. in. |
| Mexican | 180/200 | Straight reduced | 6.8 |
| Venezuelan | 180/200 | | |
| Colombian | 180/200 | Straight reduced | 7.0 |
| 750# CC tar | 180/200 | do | 2.2 |
| Mexican | 180/200 | Oxidized (heavy flux) | 8.3 |
| Venezuelan | 180/200 | do | 8.5 |
| Colombian | 180/200 | do | 5.7 |

Blends of the cracking coil tar with either natural or petroleum asphalt or both may likewise be used in the preparation of the paints for preventing rust on metallic surfaces.

I claim:

1. A method of protecting metallic surfaces against corrosion which comprises coating the said metallic surface with a composition consisting of cracking coil tar of 119° to 200° F. softening point prepared by subjecting a petroleum oil having a gravity of about 30° to 35° A. P. I. to a temperature of about 800° to 1000° F. at a pressure of 6 to 2000 pounds per square inch in a narrow confined stream, after which the heated petroleum oil is introduced into an enlarged container and the cracking coil tar separated and a volatile solvent and allowing the volatile solvent to evaporate therefrom.

2. A method of protecting metallic surfaces against corrosion which comprises coating the said metallic surface with a composition consisting of cracking coil tar of about 140° F. softening point prepared by subjecting a petroleum oil having a gravity of about 30° to 35° A. P. I. to a temperature of about 800° to 1000° F. at a pressure of 6 to 2000 pounds per square inch in a narrow confined stream, after which the heated petroleum oil is introduced into an enlarged container and the cracking coil tar separated, and a volatile solvent and allowing the volatile solvent to evaporate therefrom.

3. A method of protecting metallic surfaces against corrosion which comprises coating the said metallic surface with a composition consisting of cracking coil tar of 180° to 220° F. softening point prepared by subjecting a petroleum oil having a gravity of about 30° to 35° A. P. I. to a temperature of about 800° to 1000° F. at a pressure of 6 to 2000 pounds per square inch in a narrow confined stream, after which the heated petroleum oil is introduced into an enlarged container and the cracking coil tar separated, and a volatile solvent and allowing the volatile solvent to evaporate therefrom.

AUGUST HOLMES.